(12) United States Patent
Chi

(10) Patent No.: US 7,148,434 B2
(45) Date of Patent: Dec. 12, 2006

(54) GEARSHIFT MECHANISM FOR ELECTROMOTIVE TOY CAR

(75) Inventor: Li-Wen Chi, ShiChi (TW)

(73) Assignee: Merry Yard Enterprise Corp., Taipei Hsien (TW)

( * ) Notice: Subject to any disclaimer, the term of this patent is extended or adjusted under 35 U.S.C. 154(b) by 604 days.

(21) Appl. No.: 10/693,898

(22) Filed: Oct. 28, 2003

(65) Prior Publication Data

US 2005/0087033 A1   Apr. 28, 2005

(51) Int. Cl.
    *H01H 9/00* (2006.01)
(52) U.S. Cl. .......................... 200/6 R; 200/4; 200/332
(58) Field of Classification Search ................ 200/1 R, 200/4, 5 R, 6 R, 332–335
    See application file for complete search history.

(56) References Cited

U.S. PATENT DOCUMENTS 3,858,012 A * 12/1974 Lockard ................... 200/16 D
3,871,244 A * 3/1975 Gressard et al. ............... 74/491
4,181,827 A * 1/1980 Diepeveen ................... 200/6 A
5,430,264 A * 7/1995 Shinohara et al. ............ 200/47
5,967,303 A * 10/1999 Kurek et al. ................ 200/559
5,986,645 A * 11/1999 Brooks ........................ 345/161
6,005,308 A * 12/1999 Bryde et al. ................. 307/157
6,013,885 A * 1/2000 Kowalczyk ................. 200/315
6,461,238 B1 * 10/2002 Rehkemper et al. ........... 463/6
6,737,592 B1 * 5/2004 Hoang et al. ............... 200/1 B

* cited by examiner

*Primary Examiner*—Richard K. Lee
(74) *Attorney, Agent, or Firm*—Lowe Hauptman & Berner, LLP

(57) ABSTRACT

Disclosed is a gearshift mechanism for electromotive toy car is provided in a space defined by a left cover and a right cover, including a gearshift lever, a slide plate, an opening shield plate, an opening shield securing plate, a switch plate, pushbuttons, a switch plate affixing shaft, and a gearshift lever pivotal pin, using the gearshift lever to drive the switch plate to push a pushbutton for actuating a motor, and a pedal throttle to activate a power switch for halting, driving slow advancement, fast advancement or slow reversing of the electromotive toy car, so as to meet children's desires to imitate adults' driving maneuvering through realistic activities.

1 Claim, 9 Drawing Sheets

GEARSHIFT MECHANISM FOR ELECTROMOTIVE TOY CAR

FILED OF THE INVENTION

This invention relates to an electromotive toy car, particularly to a gearshift mechanism using a gearshift lever to drive a switch plate to push a pushbutton for actuating a motor, and a pedal throttle to activate a power switch for halting, driving slow advancement, fast advancement or slow reversing of the electromotive toy car, so as to meet children's desires to imitate adults' driving maneuvering through realistic activities.

BACKGROUND OF THE INVENTION

Because electromotive toy cars can meet children's desires to imitate adults' driving maneuvering through realistic activities, they always play an important role in the commercial market. Not only does an electromotive toy car need a colorful and striking appearance to attract children's attention, the maneuverability, degree of simulation and safety in driving are also key features for an electromotive toy car. Whether the gearshift mechanism for controlling halt, slow advancement, fast advancement, reversing of the electromotive toy car may be easily operated has direct impacts on the maneuverability and the sense of reality in simulating driving activities.

SUMMARY OF THE INVENTION

In view of the above, the electromotive toy car according to this invention is designed to provide a gearshift mechanism having a simple construction.

That is, it is a primary objective of this invention to provide a gearshift mechanism for electromotive toy car, with a compact construction and ingenious spatial arrangement, such that a space defined between a left cover and a right lover is provided with a gearshift lever, a slide plate, an opening shield plate, an opening shield securing plate, a switch plate, pushbuttons, a switch plate affixing shaft, and a gearshift lever pivotal pin. By maneuvering a gearshift lever to drive a switch plate to push a pushbutton for actuating a motor, and a pedal throttle to activate a power switch, for halting, driving slow advancement, fast advancement or slow reversing of the electromotive toy car, so as to meet children's desires to imitate adults' driving maneuvering through realistic activities.

DESCRIPTION OF THE PREFERRED EMBODIMENT

The present invention will be described in further detail hereinafter, with reference to accompanying drawings.

Figure 1:
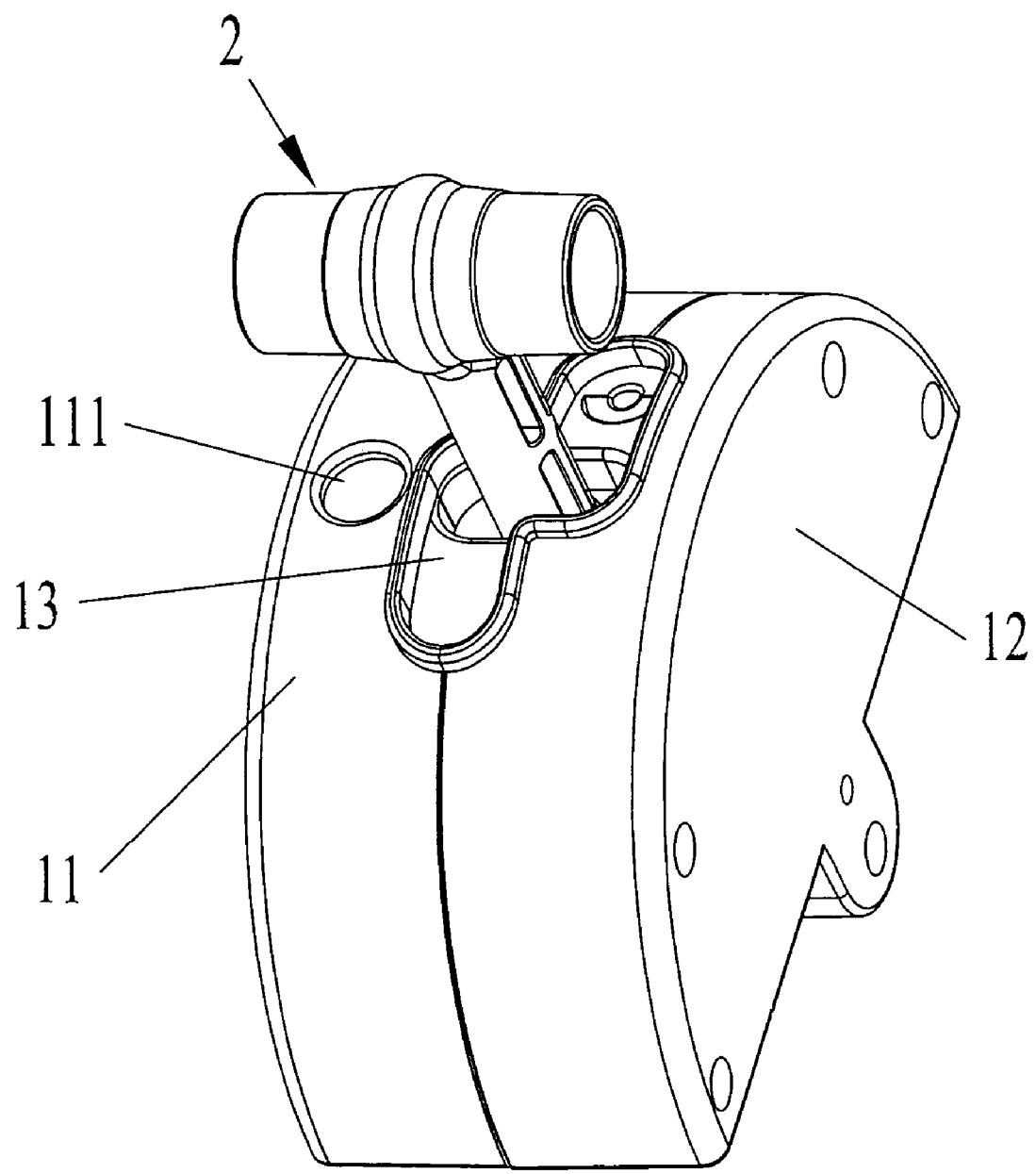
FIG. 1 is a perspective view of this invention.
Figure 2:
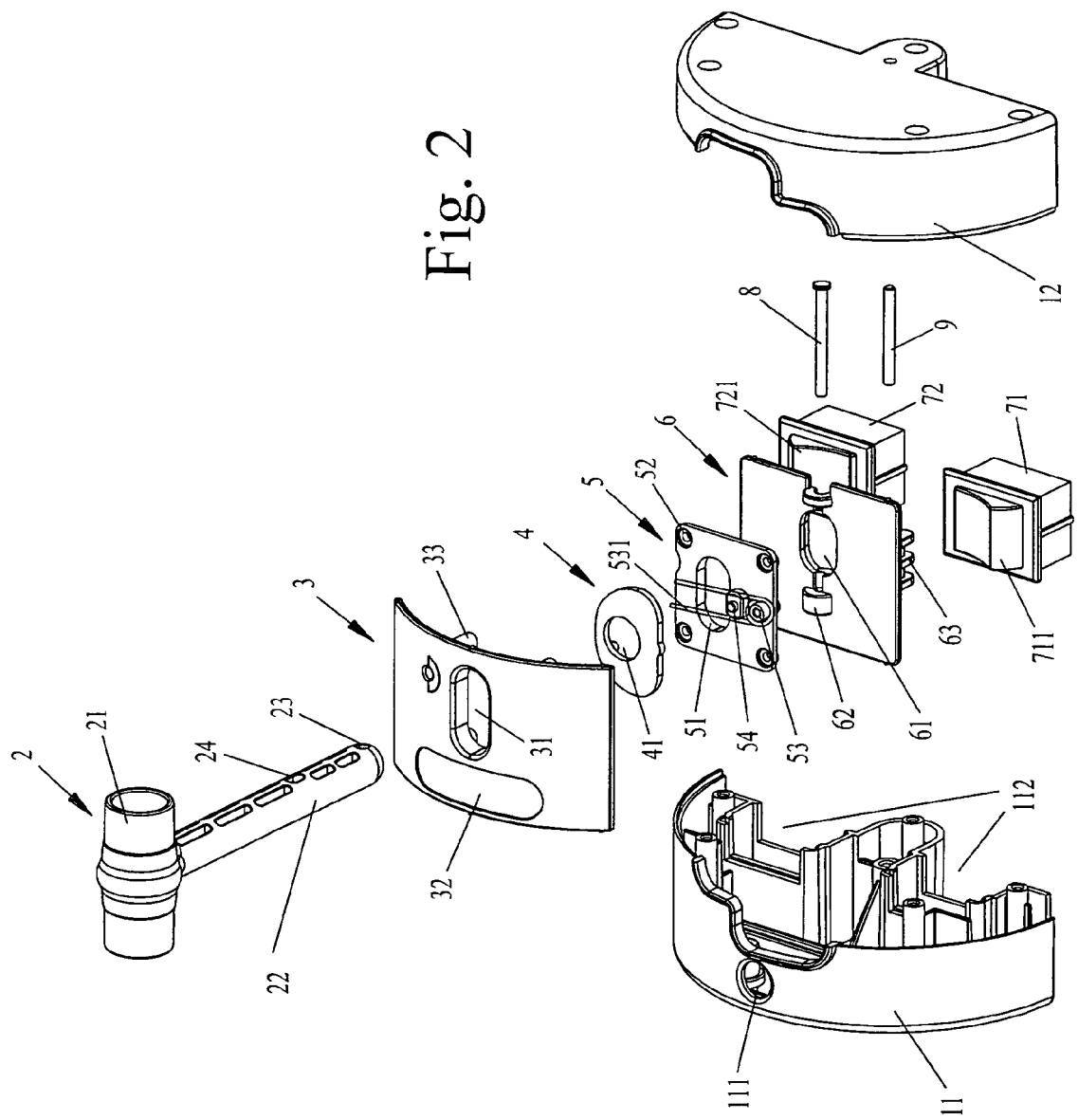
FIG. 2 is an exploded, top perspective view of this invention.
Figure 3:
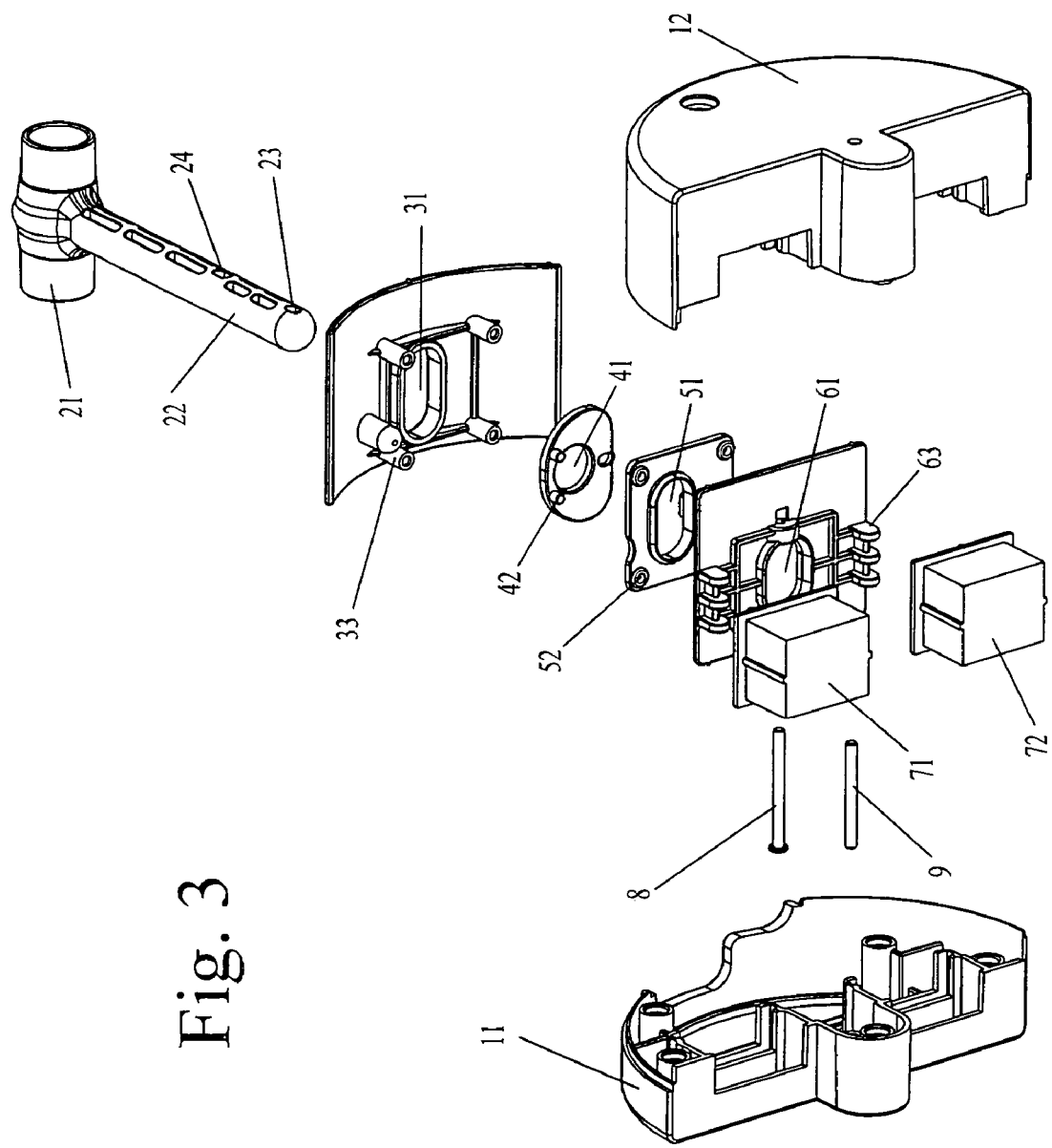
FIG. 3 is an exploded, bottom perspective view of this invention.

FIGS. 1–3 are perspective views illustrating this invention from different viewing angles. The gearshift mechanism according to this invention is provided in a space defined between a left cover 11 and a right cover 12, and comprises: a gearshift lever 2, a slide plate 3, an opening shield plate 4, an opening shield securing plate 5, a switch plate 6, pushbuttons 71, 72, a switch plate affixing shaft 8, and a gearshift lever pivotal pin 9.

The T-shaped gearshift lever 2 is constructed of a lateral grip 21 and a vertical shaft 22 that passes through a slide plate slot 31, an opening shield plate aperture 41, an opening shield securing plate slot 51 and a switch plate slot 61 in order. The gearshift lever pivotal pin 9 transversely passes through a bottom through-hole 23 of the gearshift lever 2 to join to pin openings of the left cover 11 and right cover 12, such that the gearshift lever 2 is able to move forwards and backwards about the gearshift lever pivotal pin 9 in an S-shaped gear channel 13 jointly defined by the left cover 11 and right cover 12.

The slide plate 3 includes a curved rectangular plate, formed with a gear indicator 32 along its left lengthy side. When the slide plate 3 is pushed forwards or backwards by the gearshift lever 2, the child is able to clearly see the gear indicated by the gear indicator 32 through a window 111 provided to the left cover panel. The vertical shaft 22 of the gearshift lever 2 passes through the lateral slot 31 formed on the slide plate 3. The slide plate 3 is formed with four posts 33 extending downwards from a bottom thereof. The posts 33 are formed with inner threads so as to be secured to four corner holes 52 of the opening shield securing plate 5 by screws.

The opening shield plate 4 includes an aperture 41 matched to a diameter of the gearshift lever vertical shaft 22 and is placed beneath the slide plate slot 31, so as to prevent from exposing the opening shield securing plate 5 and switch plate 6 located therebeneath. The opening shield plate 4 is formed with three pegs 42 extending downwards from a bottom thereof to urge against the opening shield securing plate 5 to thereby lean against the bottom of the slide plate 3.

The opening shield securing plate 5 includes a substantially square plate formed with four corner openings 52 to be secured into the slide plate 3 by passing screws upwards into the corner openings 52 and the inner threads within the four posts 33 at the bottom of the slide plate 3. The opening shield securing plate 5 is also formed with a lateral slot 51 through which the vertical shaft 22 of the gearshift lever 2 passes. Beneath a center of the opening shield securing plate 5 is affixed with a U-shaped torsion spring 53. Two ends 531 of the torsion spring 53 are spaced apart by a fixed button 54 provided at a front end thereof to cause the ends 531 to tightly clamp to the vertical shaft 22 of the gearshift lever 2, such that the vertical shaft 22 of the gearshift lever 2 is maintained at the center of the opening shield securing plate slot 51 by means of the torsion spring 53.

The switch plate 6 also includes a substantially square plate formed with a lateral slot 61 at a center thereof through which the vertical shaft 22 of the gearshift lever 2 passes. On opposing sides of the slot are provided with retaining pivotal holes 62 through which flattened switch plate affixing shafts 8 pass to join to apertures 24 formed on the gearshift lever 2 through the pivotal holes 62, such that the switch plate 6 is able to move forwards and backwards along with the gearshift lever 2. The switch plate 6 is provided with a plurality of claws 63 extending downwards from a bottom thereof, for pushing the pushbutton 71, 72.

The advancing/reversing pushbutton 71 and slow/fast pushbutton 72 are embedded in recesses 112 of the left cover 11, where the switch plate 6 moves forwards and backwards along with the gearshift lever 2 subjecting the claws 63 located at the bottom thereof to push one of the pushbuttons 711, 721 for actuating a motor.

Figure 4:
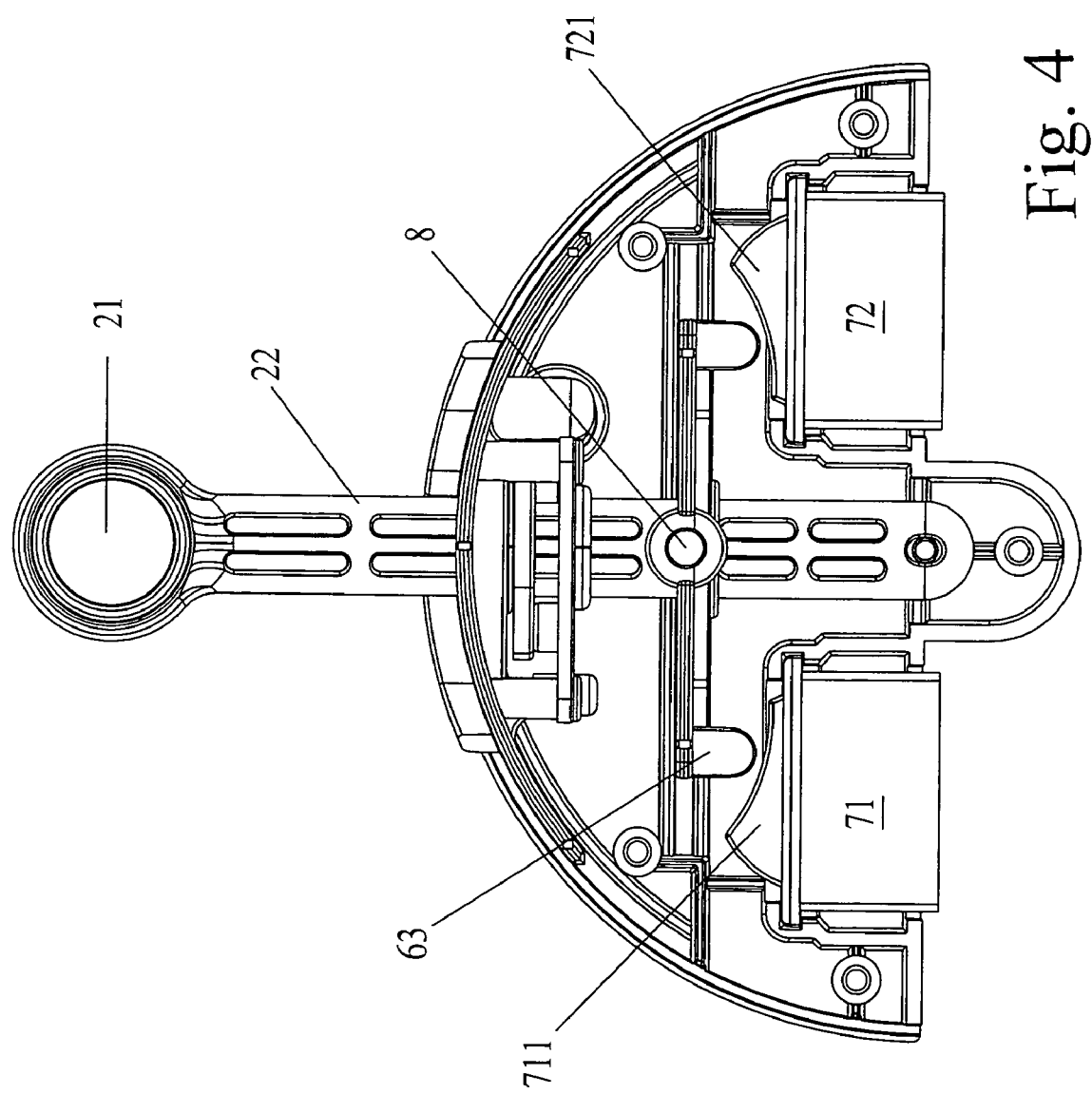
FIG. 4 illustrates a state of the gearshift lever being at the L-gear with the right cover being removed.
Figure 5:
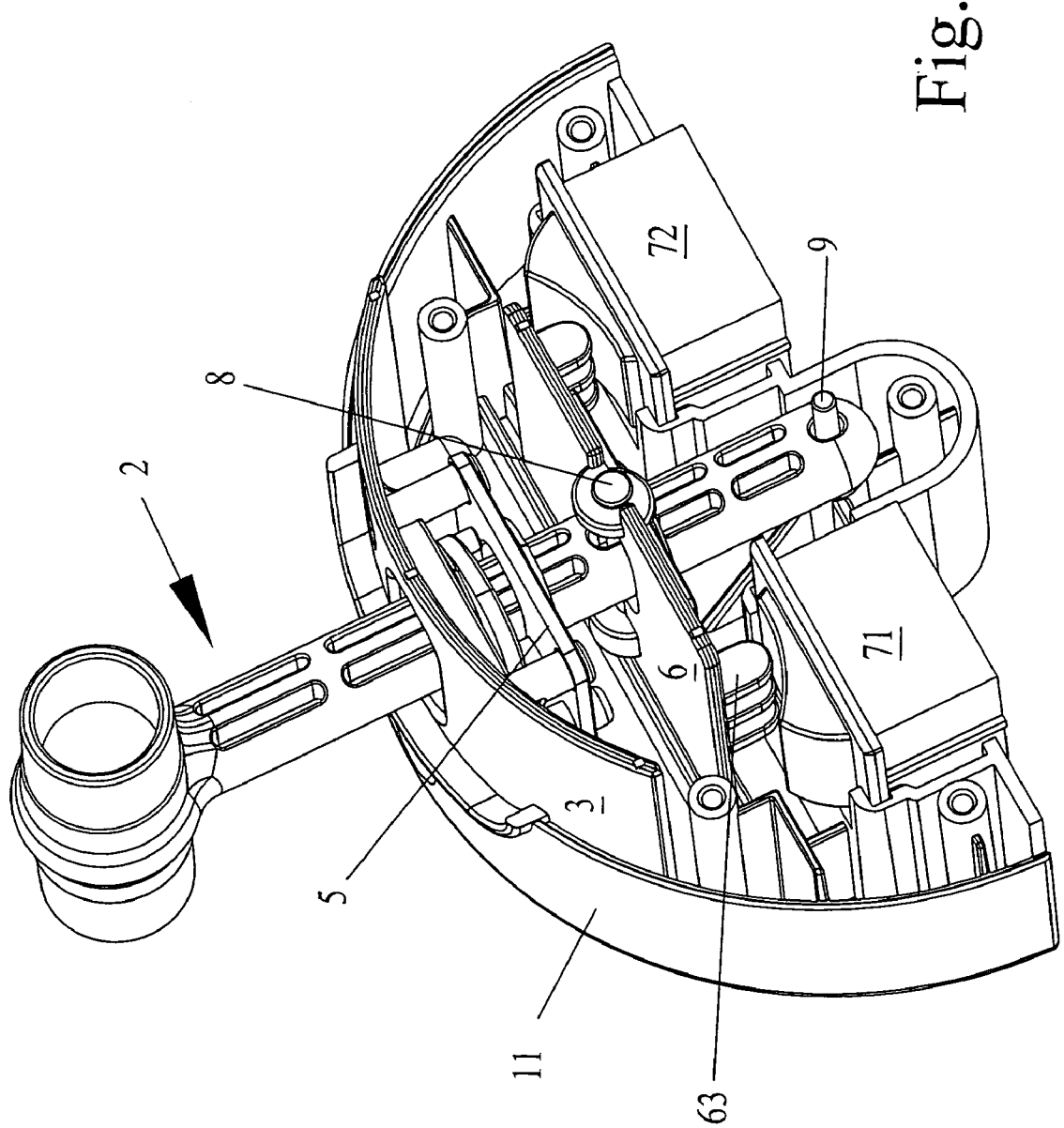
FIG. 5 illustrates a perspective view of the gearshift lever being at the L-gear with the right cover being removed.

With reference to FIGS. 4 and 5, by means of the gearshift mechanism assembled by the above-mentioned components, when the gearshift lever is shifted to the L-gear, the gearshift lever 2 is normal to the switch plate 6. At this time, the claws 63 of the switch plate 6 do not push any of the pushbuttons 71, 72. When the pedal throttle activates the power switch, the electromotive toy car is operated under the mode of slow advancement.

Figure 6:
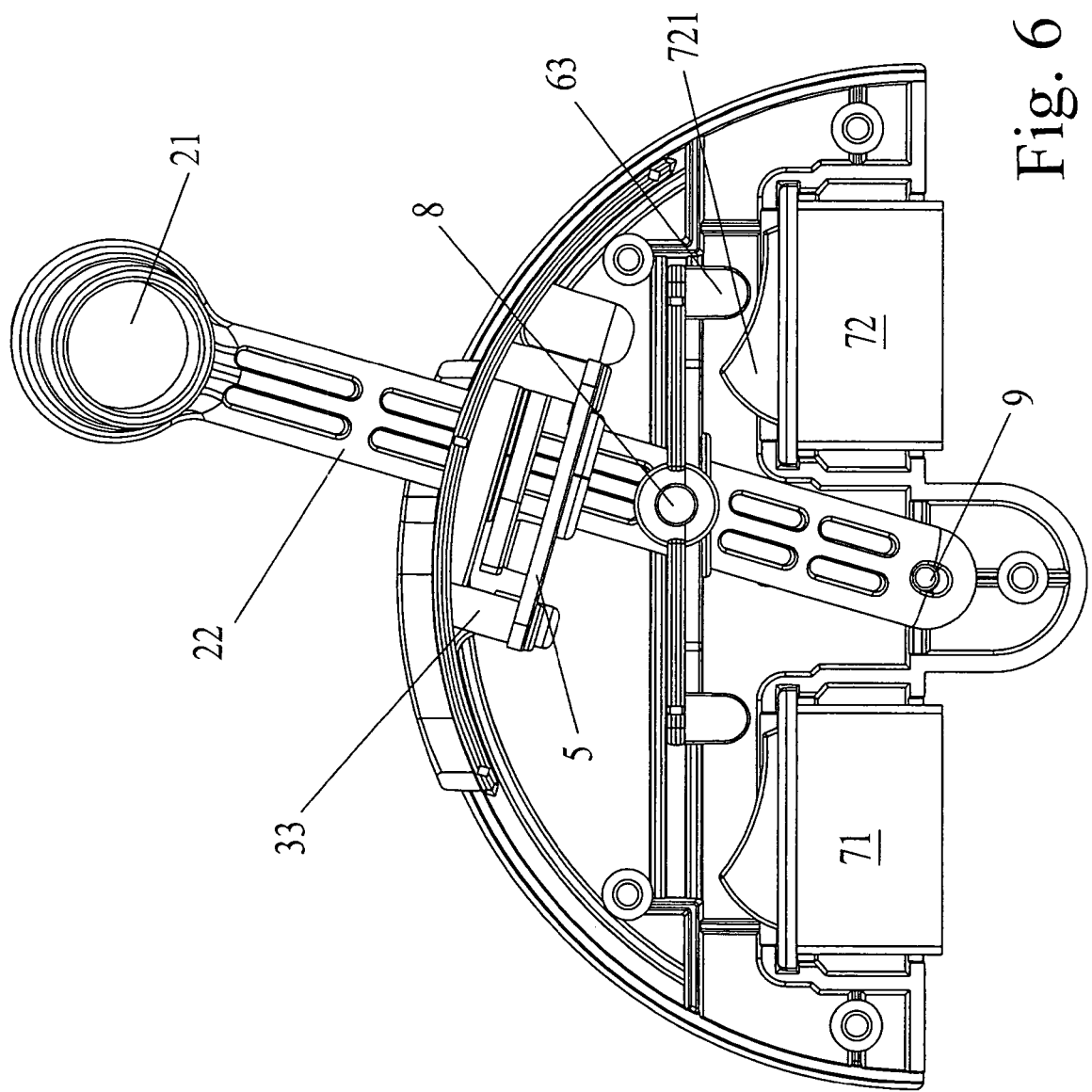
FIG. 6 illustrates a state of the gearshift lever being at the D-gear with the right cover being removed.
Figure 7:
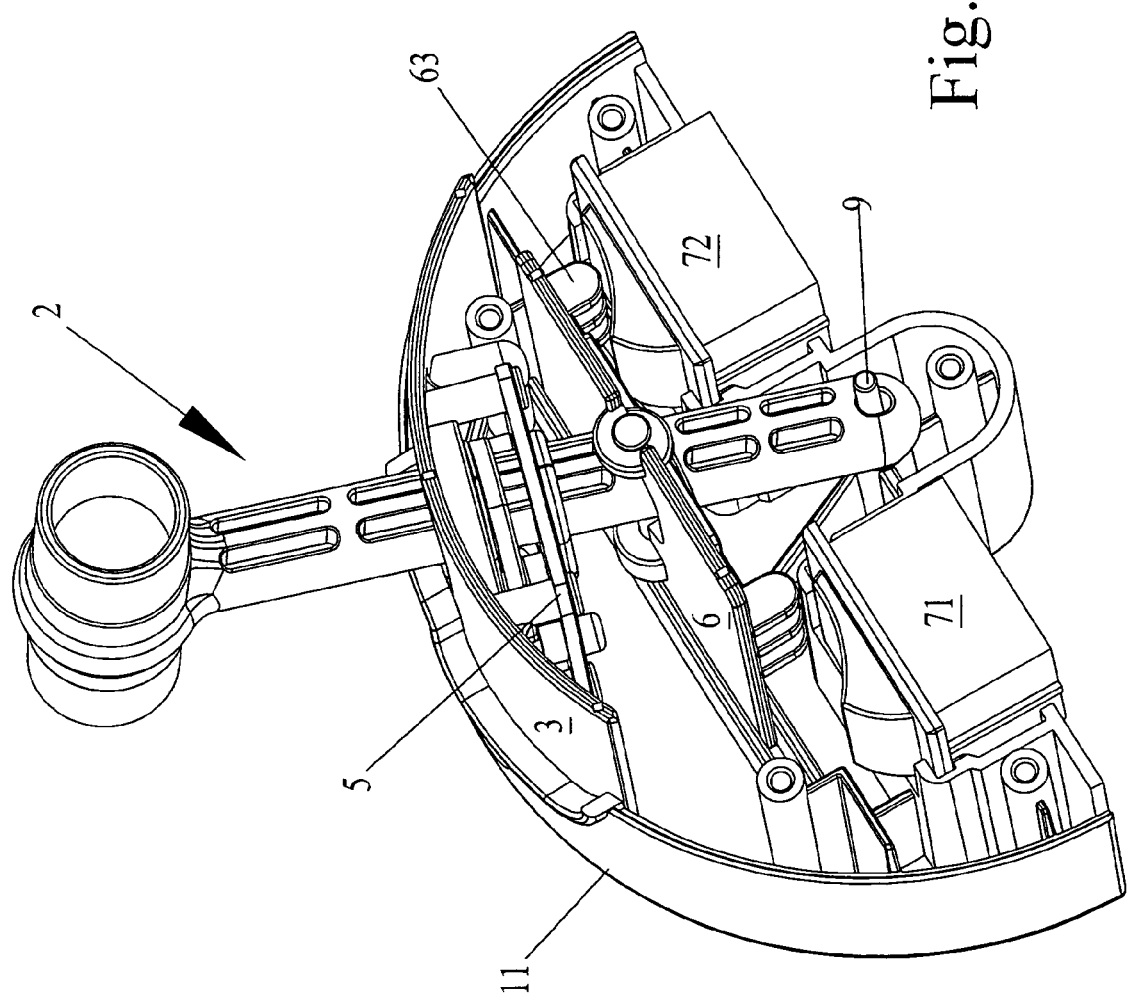
FIG. 7 illustrates a perspective view of the gearshift lever being at the D-gear with the right cover being removed.

With reference to FIGS. 6 and 7, when the gearshift lever is first maneuvered rightwards and then forwards to reach the D-gear, the gearshift lever 2 will move forwards about the gearshift lever pivotal pin 9 located at its bottom to drive forward movement of the switch plate 6, subjecting the claws 63 located at the bottom of the switch plate to push the pushbutton 721 of the fast/slow pushbutton 72. By activating the pedal throttle to activate the power switch at this time will cause the motor to drive in a forward direction to drive fast advancement of the electromotive toy car.

Figure 8:
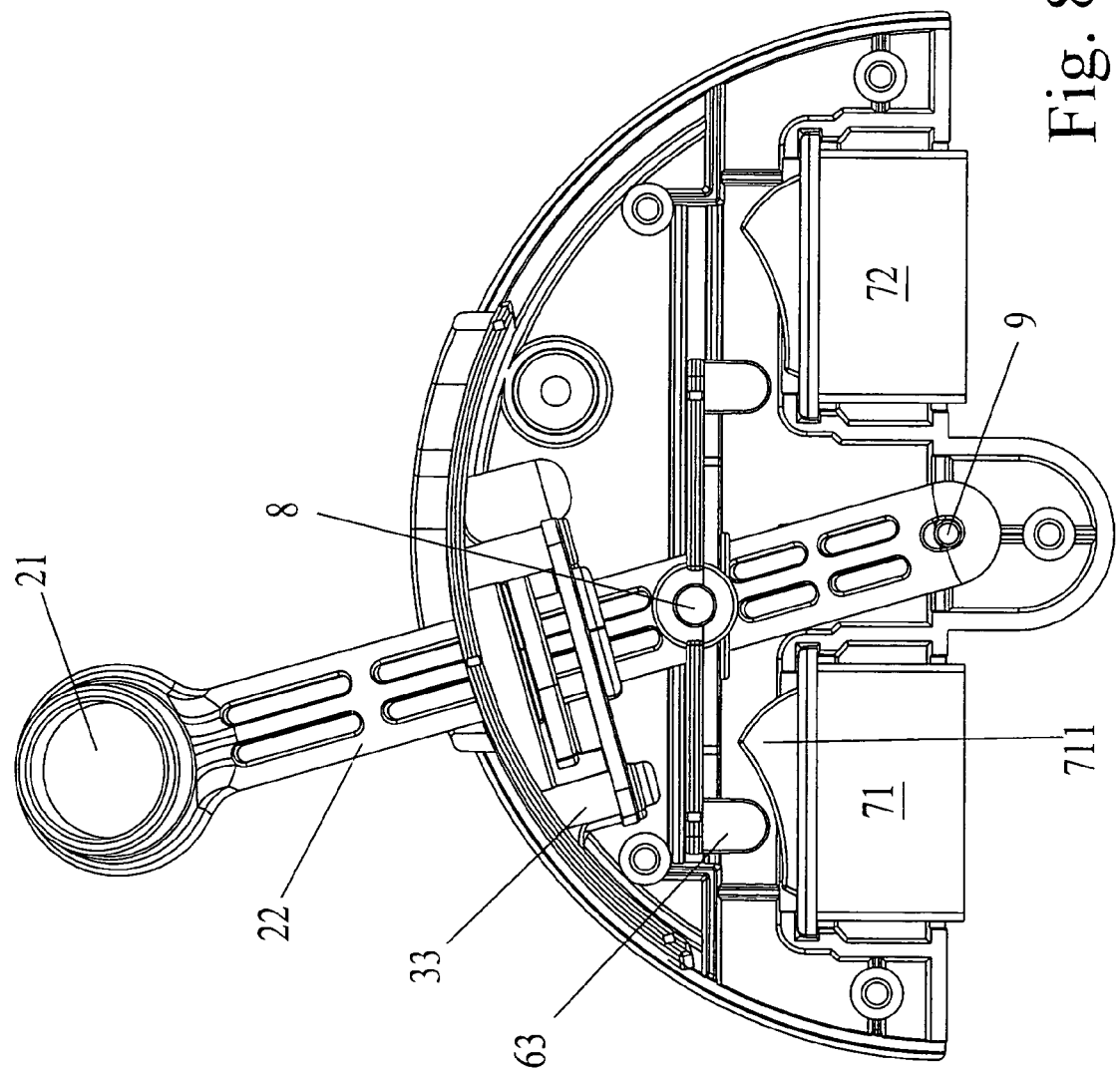
FIG. 8 illustrates a state of the gearshift lever being at the R-gear with the right cover being removed.
Figure 9:
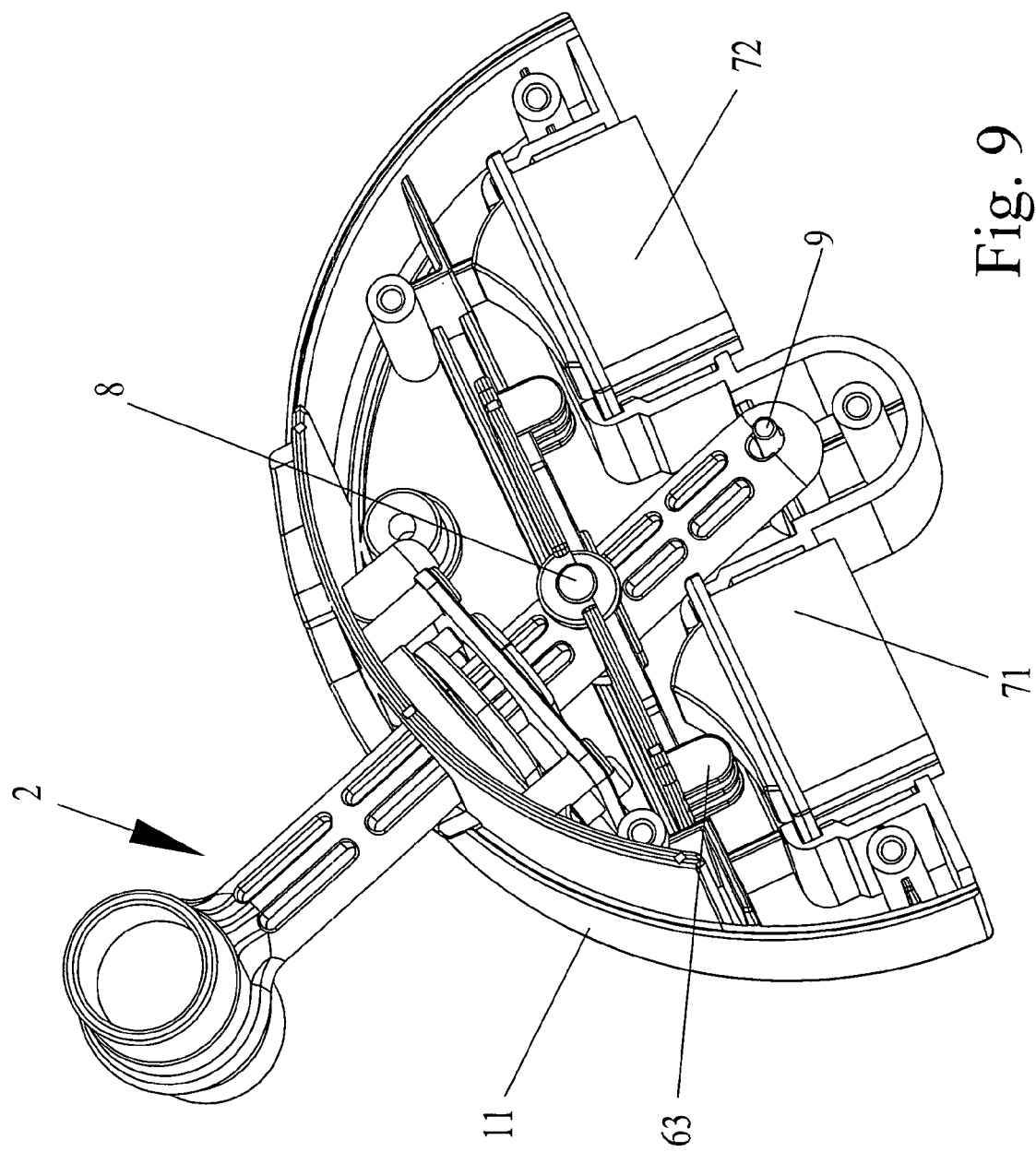
FIG. 9 illustrates a perspective view of the gearshift lever being at the R-gear with the right cover being removed.

With reference to FIGS. 8 and 9, when the gearshift lever is maneuvered leftwards and then backwards to reach the R-gear, the gearshift lever 2 will move backwards about the gearshift lever pivotal pin 9 located at its bottom to drive rearward movement of the switch plate 6, subjecting the claws 63 located at the bottom of the switch plate to push the pushbutton 711 of the fast/slow pushbutton 72. By activating the pedal throttle to activate the power switch at this time will cause the motor to drive in a reversed direction to drive slow advancement of the electromotive toy car.

In summary, the gearshift mechanism for electromotive toy car provided in a space defined by the left cover and the right cover, including a gearshift lever, a slide plate, an opening shield plate, an opening shield securing plate, a switch plate, pushbuttons, a switch plate affixing shaft, and a gearshift lever pivotal pin, using the gearshift lever to drive the switch plate to push a pushbutton for actuating a motor, and a pedal throttle to activate a power switch for halting, driving slow advancement, fast advancement or slow reversing of the electromotive toy car, is able to meet children's desires to imitate adults' driving maneuvering through realistic activities.

The above embodiments are intended for describing this invention without limiting the scope that this invention may be applied. Modifications made in accordance with the disclosures of this invention without departing from the spirits of this invention are within the scope of this invention.

What is claimed is:

1. A gear shift mechanism for electromotive toy car, provided in a space defined by a left cover and a right cover, including a gearshift lever, a slide plate, an opening shield plate, an opening shield securing plate, a switch plate, pushbuttons, a switch plate affixing shaft, and a gearshift lever pivotal pin, wherein:

the T-shaped gearshift lever is constructed of a lateral grip and a vertical shaft, the gearshift lever pivotal pin transversely passes through a bottom through-hole of the gearshift lever to join to pin openings of the left cover and right cover, such that the gearshift lever is able to move forwards and backwards about the gearshift lever pivotal pin in an S-shaped gear channel jointly defined by the left cover and right cover;

the slide plate includes a curved rectangular plate, the gearshift lever passes through a lateral slot formed on the slide plate, the slide plate is formed with four posts extending downwards from a bottom thereof, the posts are formed with inner threads;

the opening shield plate includes an aperture matched to a diameter of the gearshift lever vertical shaft and is placed beneath the slide plate slot, the opening shield plate is formed with three pegs extending downwards from a bottom thereof to urge against the opening shield securing plate;

the opening shield securing plate includes a substantially square plate formed with four corner openings to be secured into the slide plate by passing screws upwards into the corner openings and the inner threads within the four posts at the bottom of the slide plate, the opening shield securing plate is formed with a lateral slot through which the gearshift lever passes, beneath a center of the opening shield securing plate is affixed with a U-shaped torsion spring, two ends the torsion spring being spaced apart by a fixed button provided at a front end thereof to cause the ends tightly clamp to the gearshift lever, such that the gearshift lever is maintained at the center of the opening shield securing plate slot by means of the torsion spring;

the switch plate includes a substantially square plate formed with a lateral slot at a center thereof through which the gearshift lever passes, on opposing sides of the slot are provided with pivotal holes through which flattened switch plate affixing shafts pass to join to apertures formed on the gearshift lever through the pivotal holes, such that the switch plate is able to move forwards and backwards along with the gearshift lever, the switch plate is provided with a plurality of claws extending downwards from a bottom thereof, for pushing the pushbutton; and the pushbuttons are embedded in recesses of the left cover, where the switch plate moves forwards and backwards along with the gearshift lever subjecting the claws located at the bottom thereof to push one of the pushbuttons, the power switch may be activated by a pedal throttle for halting, driving slow advancement, fast advancement or slow reversing of the electromotive toy car.

* * * * *